United States Patent [19]

Savolainen et al.

[11] 4,243,533
[45] Jan. 6, 1981

[54] FILTERS WITH FILTRATE CHAMBER OVERFLOW PARTITIONS HAVING PLURAL OUTLETS

[75] Inventors: Jaakko Savolainen; Holger Engdahl; Yrjö Luukkainen; Martti Tolvanen; Jorma Surakka, all of Savonlinna, Finland

[73] Assignee: Enso-Gutzeit Osakeyhito, Helsinki, Finland

[21] Appl. No.: 19,622

[22] Filed: Mar. 12, 1979

[30] Foreign Application Priority Data

Mar. 13, 1978 [FI] Finland ................................. 780792

[51] Int. Cl.³ ............................................. B01D 29/38
[52] U.S. Cl. ..................................... 210/247; 210/307; 210/309; 210/312; 210/320; 210/411; 210/422; 210/427; 210/428; 210/323.2; 210/333.01
[58] Field of Search ................ 210/23 R, 340, 323 T, 210/333 R, 247, 346, 411, 414, 452, 522, 320, 307, 300, 301, 308, 309, 310, 311, 312, 433 R, 422, 427, 428; 55/341 R, 341 M

[56] References Cited

U.S. PATENT DOCUMENTS

| | | | |
|---|---|---|---|
| 2,391,534 | 12/1945 | Yerrick et al. | 55/287 |
| 2,862,622 | 12/1958 | Kircher, Jr. et al. | 210/333 |
| 3,513,638 | 5/1970 | Young | 55/341 R |
| 3,524,548 | 8/1970 | McDonald et al. | 210/323 T |
| 4,039,441 | 8/1977 | Fett | 210/23 R |
| 4,165,283 | 8/1979 | Weber et al. | 210/111 |

FOREIGN PATENT DOCUMENTS 44580 12/1971 Finland ................................. 210/323 T Primary Examiner—Charles N. Hart
Assistant Examiner—David R. Sadowski
Attorney, Agent, or Firm—Toren, McGeady and Stanger

[57] ABSTRACT

Periodically operating pressure filter for the concentration of a solid matter suspension, comprising a filtering tank with an input conduit for introducing the suspension to be filtered under pressure, and a drain conduit for removal of the concentrated sludge, and a number of filtering elements suspended from the ceiling, through which the filtrate flows and which are internally in communication with a filtrate collecting tank located above and which thereby collect sludge on their outer surface. The sludge has been arranged to be periodically detached by making the pressure inside the filtering element higher than on its outside. The filtrate is under atmospheric pressure in the collecting tank. For detaching the sludge periodically from the outer surfaces on the filtering elements the pressure has been arranged to be removable from the filtering tank by opening for the suspension residing there, an exit flow, whereby the filtrate in the collecting tank will pass under hydrostatic pressure effect in counter-current fashion through the filtering elements.

3 Claims, 2 Drawing Figures

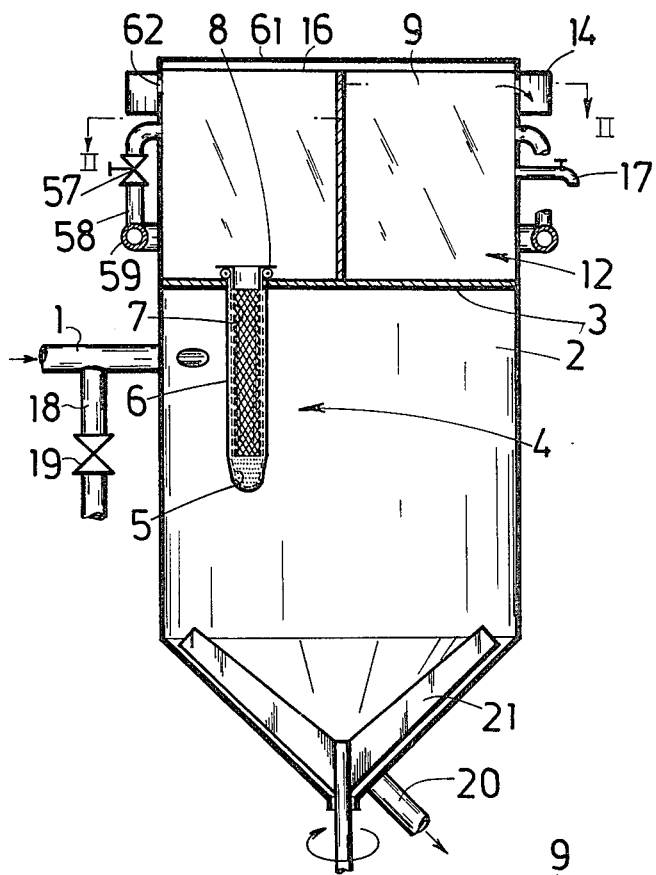
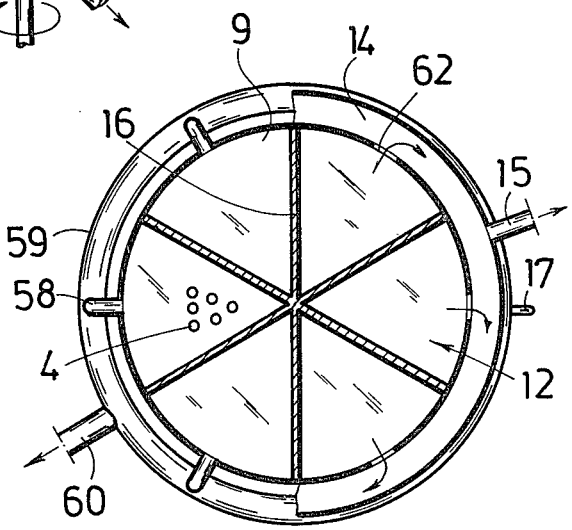

FILTERS WITH FILTRATE CHAMBER OVERFLOW PARTITIONS HAVING PLURAL OUTLETS

The present invention concerns a periodically operating pressure filter for the concentration of a solid matter suspension, comprising a filter tank with an input conduit for introducing the suspension to be filtered under pressure and a draining conduit for removing the concentrated sludge, and a number of filtering elements suspended from the ceiling, through which the filtrate flows and which internally communicate with a filtrate collecting tank located above and which thereby collect on their outer surface sludge, this sludge having been arranged to be detached by making the pressure inside the filtering element higher than on its outside.

A pressure filter of this type is eminently suitable for use in filtering white liquor from milk of lime in the digesting liquor regeneration process in a sulphate pulp mill, but it may also well be employed in other filtering tasks. A pressure filter for white liquors is known e.g. through the Finnish Pat. No. 44580. The filter of prior art is otherwise similar to that mentioned initially, but it is continuously operating. The filter of prior art presents the drawback that it comprises an expensive counter-flushing valve serving the cleaning of the filtering elements, or filtering mantles. Furthermore, it presents an expensive compartment structure in the upper part of the filtering tank. Moreoever, pumping energy is being wasted therein, because owing to the retrograde flushing more than 60% of the filtered liquor are continuously urged back against the flow. The object of the present invention is to solve the filtering problem in a less expensive way both as regards operating costs and equipment.

The invention is characterized in that the filtrate is under atmospheric pressure in the collecting tank and that for the periodic detaching of sludge from the outer surfaces of the filtering elements the pressure has been arranged to be removable from the filtering tank by opening an exit flow for the suspension therein, whereby the filtrate present in the collecting tank will under hydrostatic pressure pass in countercurrent fashion through the filtering elements.

Thus according to the invention no pumping energy whatsoever is wasted during the filtering element washing step: the filtrate runs under hydrostatic pressure through the filtering elements, cleaning them. It is possible to open an exit flow path for the suspension in the filtering tank in a number of ways. For instance, there may be on the input pipe for the suspension to be filtered, a branch pipe with valve, into which both the suspension arriving from the pump and a sufficient amount of suspension residing in the filtering tank is conducted. On the other hand, the outflow of suspension from the filtering tank may be achieved by opening the draining conduit of the filtering tank.

An advantageous embodiment of the invention is characterized in that removal of the filtrate from the collecting tank has been arranged to take place by overflow over the rim of the tank into an encircling collecting trough. This is an exceedingly simple way of collecting the filtrate.

Another favourable embodiment of the invention is characterized in that the collecting tank has been divided into sections by means of partitions. The partitions are most suitable radially placed. Each section has a separate, closable draining conduit, which lies below the overflow edge but above the bottom. By opening this drain line, any desired section may be excluded from the operation. This is necessary when it has been found with the aid of samples that the filtrate entering this particular section is impure. This is a sign that one of the filtering elements supplying filtrate into this section, or one filtering mantle, is damaged. The impure filtrate entering the section may be reintroduced through the drain line on the intake side of the filtering tank.

One embodiment of the invention is characterized in that the partitions between sections have a greater height than the overflow rim. It is hereby achieved that the filtrates cannot flow from one section into another.

The invention shall be described in the following, reference being made to the attached drawings, wherein:

FIG. 1 displays schematically a pressure filter according to one embodiment of the invention, in vertical section.

FIG. 2 shows the section along line II—II in FIG. 1.

The suspension to be filtered, or milk of lime in this case, arrives in the filtering tank 2 by the conduit 1. From the ceiling 3 of the tank 2 are suspended cylindrical filtering elements 4. The number of such may be e.g. 200, although in the drawings only one such has been depicted, considerably enlarged. The white liquor of the milk of lime is filtered, by effect of the pressure prevailing in the tank 2, through the mantle 5 on the filtering element, and the solid matter of the milk of lime, or the lime sludge, is deposited as a layer 6 on the surface of the filtering mantle. Within the mantle, a sturdy metal net 7 has been provided, which prevents the mantle from being squeezed together. The metallic net 7 has been welded to the flange 8. The filtrate, or white liquor, flows into the collecting tank 12. From the collecting tank the white liquor flows over the overflow rim or through apertures 62 into the trough 14, and thence along the line 15 to further treatment.

The collecting tank 12, with ceiling 61, has been divided by radial partitions 16 into sections 9. The partitions 16 have a height greater than that of the overflow rim 62, so that the liquors entering different sections cannot be mixed before the overflow. From the wall of each section 9 there departs a cock 17, from which a white liquor sample can be drawn. If the sample indicates that the particular section receives white liquor through a damaged filtering mantle 5, measures are undertaken to shut this section out of operation. Therefore, each section 9 has its own drain conduit 58, carrying a valve 57. The valve 57 is opened, whereby the impure filtrate starts to flow by the line 58 to the common ring pipe 59 and further into the pipe 60, which communicates with the intake side of the pump in the entry conduit 1 of the filtering tank 2. Hereby no impure filtrate can be incorporated in the pure filtrate coming from other sections 9. The drain conduit 58 is located below the overflow rim 62, but above the bottom of the section. This guarantees that there is always filtrate in the section, such being needed at the step when the lime sludge layer 6 accumulated on the mantles 5 is being detached. This is important so that no thick layer might build upon on these mantles, which would fall off in big lumps in uncontrolled manner.

Removal of the lime sludge accumulating upon the mantle 5 is accomplished as follows. From the input conduit 1 downwardly departs a line 18 with an incorporated valve 19, this valve being normally closed. This valve 19 is now opened, whereby the pressure in the filtering tank 2 is dissipated. The hydrostatic pressure of the liquid in the collecting tank 12 forces the liquor to flow back through the mantles 5, whereby the lime sludge course 6 is detached and falls to the bottom of the tank 2. The lime sludge is drained through the drain conduit 20, and the rotating blade 21 prevents adhesion of the lime sludge to the bottom of tank 2. The valve 19 is then closed again and the filtering commences once more.

It is obvious to a person skilled in the art that different embodiments of the invention may vary within the scope of the claims presented below.

We claim:

1. Improvement in a periodically operating pressure filter for the concentrating of a solid matter suspension and separating a filtrate, comprising a filtering tank comprising a bottom, first side walls extending upwardly from said bottom and a ceiling extending across the upper ends of said first side walls with an input conduit means connected to said first side walls for introducing the suspension to be filtered under pressure, a first drain conduit in said bottom for removal of the concentrated sludge from said tank, and a number of cylindrical filtering elements dependently supported from said ceiling and extending downwardly into said tank so that the filtrate flows under pressure from said tank through said filtering elements, a filtrate collecting tank located above said filtering tank with said ceiling of said filtering tank forming the bottom of said collecting tank, said collecting tank including second side walls extending upwardly from said ceiling so that the filtrate flows from said filtering element into said collecting tank said filtering elements arranged to collect sludge on the outer surfaces to be periodically detached by making the pressure inside said filtering elements higher than within said filtering tank, wherein the improvement comprises that said collecting tank is arrange to maintain the filtrate under atmospheric pressure, said input conduit means being arranged for releasing the pressure acting in the said filtering tank so that the sludge can be periodically detached from the outer surfaces of said filtering elements by backflow from said collecting tank through said filtering elements into said filtering tank wherein the pressure has been released, means in said second side walls of said collecting tank for forming an overflow therefrom at a location spaced upwardly from said ceiling forming the bottom of said collecting tank, means for collecting the filtrate flowing from said overflow means, plural partitions within said collecting tank for dividing said collecting tank into a plurality of sections with said overflow means being located in each of said sections, said overflow means comprising an overflow opening from each of said sections located in said second side walls, a separate normally closed second drain conduit connected to said second side walls in each of said sections with said second drain conduit opening through said second side walls below said overflow opening and above the bottom of said collecting tank, so that by opening said second drain conduit associated with a particular one of said sections the filtrate therein can be drained to a level below said overflow opening.

2. Pressure filter, as set forth in claim 1, wherein the upper end of said partitions are located upwardly from said overflow openings so that flow over said partitions between said sections is prevented.

3. Pressure filter, as set forth in claim 1, wherein a drain cock is attached to each said section for withdrawing a sample therefrom for checking the condition of the filtrate therein.

* * * * *